US005684716A

United States Patent [19]
Freeman

[11] Patent Number: 5,684,716
[45] Date of Patent: Nov. 4, 1997

[54] REMOTE VIDEO TRANSMISSION SYSTEM

[76] Inventor: Mitchael C. Freeman, 14318 E. 11th St., Tulsa, Okla. 74108

[21] Appl. No.: 505,454

[22] Filed: Jul. 21, 1995

Related U.S. Application Data

[63] Continuation of Ser. No. 198,130, Feb. 16, 1994, Pat. No. 5,579,239.

[51] Int. Cl.$^6$ ...................................................... H04L 5/00
[52] U.S. Cl. .................. 364/514 C; 455/3.1; 455/33.1; 348/14; 379/90; 386/46; 386/109
[58] Field of Search ........................... 364/514 A, 514 C; 455/3.1, 33.1; 348/14, 15; 358/311, 335; 379/90; 386/46, 109

[56] References Cited

U.S. PATENT DOCUMENTS

| | | | |
|---|---|---|---|
| H1175 | 4/1993 | Giorgio | 370/18 |
| 2,095,360 | 1/1937 | Green | 178/5.6 |
| 2,203,758 | 6/1940 | Walker | 178/5.6 |
| 2,302,852 | 11/1942 | Goddard | 250/6 |
| 2,576,115 | 11/1951 | Hill | 178/44 |
| 2,881,427 | 4/1959 | Huber | 343/200 |
| 4,311,877 | 1/1982 | Kahn | 179/15.55 R |
| 4,637,035 | 1/1987 | Betts | 375/8 |
| 4,663,660 | 5/1987 | Fedele et al. | 358/136 |
| 4,734,920 | 3/1988 | Betts | 375/8 |
| 4,825,286 | 4/1989 | Graves | 358/143 |
| 4,862,456 | 8/1989 | Giorgio | 370/118 |
| 4,864,567 | 9/1989 | Giorgio | 370/118 |
| 4,963,995 | 10/1990 | Lang | 358/335 |
| 4,969,040 | 11/1990 | Gharavi | 358/136 |
| 5,016,100 | 5/1991 | Citta et al. | 358/133 |
| 5,058,133 | 10/1991 | Duncanson et al. | 375/38 |
| 5,065,396 | 11/1991 | Castellano et al. | 370/84 |
| 5,127,021 | 6/1992 | Schreiber | 375/1 |
| 5,148,272 | 9/1992 | Acampora et al. | 358/133 |
| 5,253,275 | 10/1993 | Yurt et al. | 375/122 |
| 5,272,529 | 12/1993 | Frederiksen | 358/133 |
| 5,293,378 | 3/1994 | Shimizu | 370/94.1 |
| 5,355,167 | 10/1994 | Juri | 348/405 |
| 5,355,450 | 10/1994 | Garmon et al. | 395/162 |
| 5,361,278 | 11/1994 | Vaupel et al. | 375/122 |
| 5,365,272 | 11/1994 | Siracusa | 348/426 |
| 5,390,239 | 2/1995 | Morris et al. | 379/93 |
| 5,426,513 | 6/1995 | Scorse et al. | 358/433 |
| 5,426,645 | 6/1995 | Haskin | 370/118 |
| 5,440,336 | 8/1995 | Buhro et al. | 348/13 |
| 5,452,289 | 9/1995 | Sharma et al. | 370/32.1 |
| 5,471,470 | 11/1995 | Sharma et al. | 370/81 |
| 5,482,043 | 1/1996 | Zulauf | 128/660.04 |
| 5,495,284 | 2/1996 | Katz | 348/15 |
| 5,508,942 | 4/1996 | Agarwal | 364/514 R |
| 5,579,239 | 11/1996 | Freeman et al. | 364/514 C |
| 5,585,850 | 12/1996 | Schwaller | 348/388 |

OTHER PUBLICATIONS

Microcom® Bridge/Router™ Introducing the WANmiser™ Advantage, Sep. 1993.

Primary Examiner—Emanuel T. Voeltz
Assistant Examiner—Patrick Assouad
Attorney, Agent, or Firm—Scott R. Zingerman; Frank J. Catalano

[57] ABSTRACT

A remote video transmission system for digitizing and compressing an audio/visual signal, transmitting that signal over low band width lines, such as land telephone lines, cellular telephone lines, or radio frequencies, decompressing the digitized data and converting it to an audio/visual signal for broadcast. Components of this system include: A remote unit, a host unit, and a playback unit. The remote unit is capable of digitizing and compressing the audio/visual signal as well as transmitting the compressed, digitized data. Data may be divided and sent to multiple ports for output. Data may also be edited prior to transmission. The host unit is automated to receive data transmitted from the remote unit and reassemble the data if it has been divided. The playback unit stores and automatically catalogs transmitted data files. The player unit also decompresses the digitized data files and converts them to an audio/visual signal which may then be broadcast. The audio/visual signal can either be NTSC, PAL, or Y/C video.

34 Claims, 2 Drawing Sheets

REMOTE VIDEO TRANSMISSION SYSTEM

This is a continuation of application Ser. No. 08/198,130, filed on Feb. 16, 1994 now U.S. Pat. No. 5,579,239.

BACKGROUND OF THE INVENTION

Field of the Invention

This invention relates to capturing a video signal at one location and transmitting that signal to another location over telephone lines, cellular, radio and other telemetric frequencies.

Advances in the information highway promotes the United States as a world leader in the computer, video and broadcast industries. This invention adds to that information highway.

Transmission of a real time video signal from a remote location to a base location is conventionally done by one of two methods: Microwave or satellite. Equipment associated with these methods is extremely expensive and has significant limitations. The large amount of equipment necessary for satellite technology for remote transmission requires that the equipment be installed in trucks having an integral satellite dish. The signal is received from the video camera, beamed to the satellite, and then beamed to the base location for broadcast. The enormous amount of equipment and the sophisticated technology required makes satellite transmission extremely expensive and impractical for many applications. Satellite transmission does, however, send real time broadcast quality signals. The costs associated with satellite transmission are justifiable for large events such as sporting events where transmission could be made from a single location over a sustained period of time. It is not practical, however, for coverage such as news coverage where short segments from many different locations are necessary. An example would be in covering a natural disaster. Speed in obtaining and broadcasting video footage is a competitive requirement in news gathering situations.

The required set up time and inaccessibility of the satellite truck are significant additional limitations to satellite type transmission.

Microwave transmission technology overcomes some of the limitations of satellite technology but has several additional limitations of its own. Microwave transmission systems are less expensive and require less equipment. With a microwave system, a video signal is obtained and transmitted from the remote location at microwave frequencies from a vehicle mounted transmitting antenna to a base antenna for broadcast.

Difficulties have been encountered using this technology in aligning the antenna on the vehicle with the base antenna. Obstructions between the transmitting antenna and the base antenna may also prevent passage of the signal. Setup limitations also inhibit the use of microwave transmission systems in obtaining short segments of video at one location, transmission of that signal, moving to another location, transmission, movement, etc. Transmission is also limited to accessibility of the vehicle to the location of the subject matter.

The limitations of satellite and microwave technology have forced video broadcasters to devise alternative means of transmission, which may include: Setting up a remote microwave or satellite transmission post and transporting segments on video tape to it from multiple remote locations. More often, broadcasters capture video segments on tape and then manually transport those tapes back to the station as quickly as possible for broadcast.

With the establishment and advancements in cellular technology, television broadcasters have begun sending teams into remote locations for reports transmitted via cellular telephone. Cellular technology provides the ability to access a location and immediately report information back to the station. This use of cellular telephones transmits voice messages only and excludes video transmission altogether. Cellular technology has also been used to transmit data such as facsimile and computer file transmissions from one location to another. Cellular telephones have been quick to transmit data received from a facsimile machine or computer having a modem to a second fax machine or computer. Cellular combined with computer technology has never been used, however, to transmit a broadcast quality video signal.

A need, therefore, exists in the art for a highly portable, cost-effective method and apparatus for capturing and transmission of broadcast quality video from a remote location to a base location. A need also exists for a capture and transmission apparatus over cellular, land lines, or radio or other frequencies. Additionally, with the current FCC limitations regarding cellular transmissions from airborne craft an additional need is evidenced for video over the radio or other telemetric frequencies.

SUMMARY OF THE INVENTION

It is the purpose of the present invention to provide a method and means for capturing full-color, full-motion audio/video signals, digitizing and compressing the signals into a digitized data file, and transmitting the signals over telephone lines, cellular, radio and other telemetric frequencies.

A second object includes splitting the digitized, compressed, audio/video signal prior to transmission in order to reduce transmission time.

A further object is to provide an apparatus that will transmit audio/video files for immediate broadcast over radio frequencies, cellular telephone frequencies, or land telephone lines.

An apparatus to accomplish this purpose includes a remote unit, a host unit, and a player or a basic embodiment includes a remote and a combined host/player unit. This apparatus provides the capability of digitizing and compressing a signal which is then transmitted over low band width lines.

The remote unit includes means for digitizing and compressing a video signal, storage of the digitized and compressed data file, and transmission of this data file over telephone lines, cellular, radio and other telemetric frequency. The remote unit may also split the data file prior to transmission for multiple simultaneous transmissions in order to reduce transmission time. The host unit is automated to receive the transmitted data file, recombine it if it has been split, and store the recombined data file to the playback unit. The playback unit stores and automatically catalogs transmitted data files. The playback unit also decompresses the digitized data file and converts it to an audio/visual signal for broadcast.

In one preferred embodiment, an audio/visual signal is input into the remote unit from a video camera at a remote location. The remote unit is a combination portable personal computer having one or more computer interfaces and a corresponding number of cellular telephones. Computer software loaded on a hard disk drive in the remote unit instructs it to capture the input signal to a video capture card within the remote unit. The video capture card takes the audio/visual signal, digitizes it into a computer data file, and compresses that data file. Once digitized and compressed, the data file is captured in the computer's memory by a capture module on the video capture card. A software sequence then instructs the computer central processing unit to store the captured data file on the computer's hard disk drive. After the video file has been captured, it may be edited as desired prior to transmission to the host unit.

Once stored, a computer program sequence removes the digitized data from the hard drive, breaks the data file, and sends it to one or more computer interfaces which transmit the data file, using a corresponding number of cellular telephones, to the host unit. The data file is split and organized so as to reduce the amount of time of transmission of the data file.

A software sequence installed on the remote unit automatically catalogs data files stored in the system hard drive. These files are cataloged visually on a computer monitor for easy visual recognition. A single frame of video from each stored data file is displayed on the monitor in a catalog array to allow the operator the ability to quickly identify the file and select a file for retrieval or transmission to the host unit as required.

In an alternate embodiment, a basic one, the signal is not divided before it is transmitted. In this alternate embodiment, only a single interface and a single cellular phone are necessary.

The host unit is a desktop personal computer with installed communications software and one or more computer interfaces connected to a corresponding number of telephone lines. The interfaces are set to receive transmitted data files from the remote unit.

If the data files have been split for transmission, a software program recombines the split file back to its original single data file. A computer monitor is connected to the host unit for viewing of the stored data files at the host unit. A software program also copies this recombined data file to a network hard disk drive of the playback unit. The host unit and the playback unit are interfaced to allow transfer of data files. The computer to computer interface between the host unit and the playback unit is a computer network in the preferred embodiment, however, any known port to port connection could be substituted.

The playback unit is the interface between captured video and the master control which outputs the signal. Once the recombined data file has been stored on the networked hard disk drive of the playback unit, the data file may then either remain stored for later use or retrieved for broadcast.

Stored data files may be edited at the host location as desired.

For broadcast, a video card located in the playback unit retrieves the stored data file, decompresses the file, and converts the digitized data to VGA. The video card in the playback unit is similar to the video card in the remote unit with the exception that the card in the playback unit does not have a capture module.

Once the data file has been decompressed and converted to digital, a converter card converts the VGA signal to the desired signal for broadcast (NTSC, PAL, Y/C video, etc.) Hardware playback of the signal or output of the signal is to a monitor or VCR for storage on conventional video tape or immediate broadcast.

Other features and advantages of the invention will become apparent in view of the drawings and following detailed description.

DETAILED DESCRIPTION OF THE PREFERRED EMBODIMENT

Figure 1:
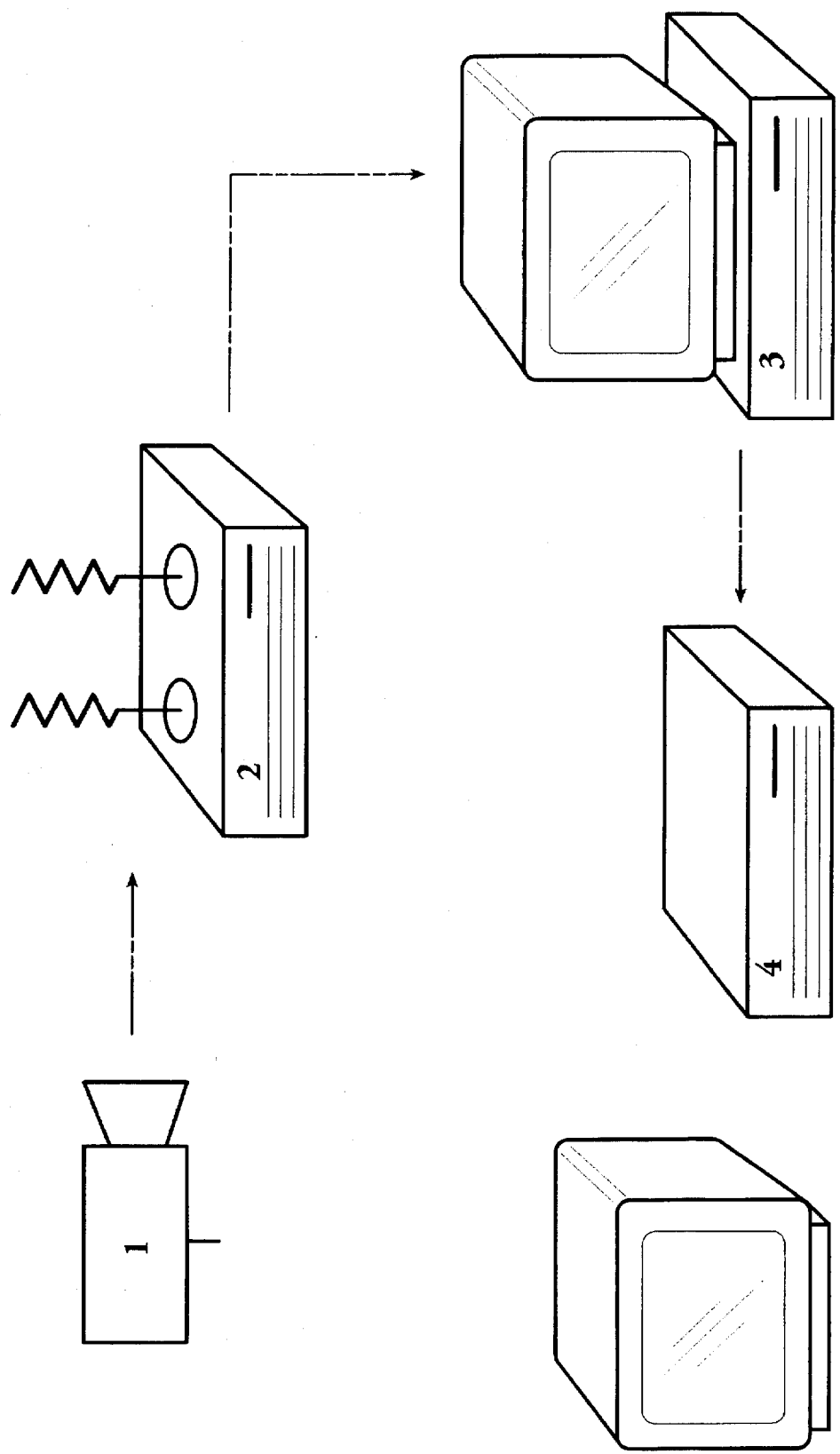
FIG. 1 depicts the components and the Sequence of the process of the present invention.

The drawings represent the present invention wherein FIG. 1 depicts the remote unit 2, wherein the input signal is captured, compressed, digitized, and transmitted to a host unit 3 which receives the transmitted video signal and stores it to playback unit 4 where it can be output to a monitor or edited for playback or broadcast. In the preferred embodiment, the data file is split by the remote unit 2 prior to transmission to the host unit 3. The host unit 3 recombines the split data file and stores it to playback unit 4 via a computer network.

In the preferred embodiment, remote unit 2 is a portable personal computer having a 486DX-2/66 motherboard, 10-inch plasma display, 210 MB notebook hard disk drive, MS DOS Ver. 6.2 operating system, Microsoft® Windows™ Ver. 3.1, Microsoft® Video for Windows, Procom Plus® for Windows, trackball bus mouse, high speed serial ports, 1 MB Windows accelerator video card, video capture card with capture module, audio capture card, SVGA to NTSC converter, SVGA video adapter. The remote unit also has up to four computer interfaces such as modems, each connected to a cellular telephone.

A signal is input into remote unit 2 from any device having the capacity to output a video signal 1, such as a video camera, video cassette recorder/player, laser disc player, etc. The video signal received by the remote unit can be of any generally known format, such as NTSC, PAL, and Y/C video (or S video). The remote unit 2 is designed to be portable so that it can be transported and used in areas which are inaccessible or unsuited for a conventional desktop personal computer. It is understood, however, that remote unit 2 could be a desktop computer or have variations in its internal configuration.

The video signal input into the remote unit is received by a video card having a capture module therein. Such a card is available commercially from Intel/IBM. A computer software program such as "VIDEO FOR WINDOWS" available from MicroSoft® operates with the video card and capture module to capture, digitize, and compress the video signal into a data file. Other software packages are commercially available for use in operating environments other than windows and may be substituted for "VIDEO FOR WINDOWS."

A software sequence, discussed below, instructs "VIDEO FOR WINDOWS" what parameters to capture the file under. A permanent capture file is stored on the hard disk of the remote unit and is called up into the remote unit's RAM where an input video signal is captured. This permanent capture file has a 10 Mb default, however, in the event a larger file is created, the capture file will expand to the requisite size.

The capture card in the remote unit uses BIT-MAP technology to capture and display motion of the video file. BIT-MAP technology is suitable in order to maximize transmission speed.

As it is being captured in the capture file, the input signal is being digitized and compressed. The digitized and compressed data file is then named and captured in the computer's random access memory (RAM) for transmission to the host unit. The "VIDEO FOR WINDOWS" software package allows for editing of a data file once captured. In this way, editing can be accomplished at the remote location prior to transmission of the file. The digitized, compressed, and captured file is displayed visually on the monitor.

As stated above, the video file is captured according to system parameters selected on the remote unit for each data file. The capture software sequence A includes the following steps:

CAPTURE SOFTWARE SEQUENCE A

Figure 2:
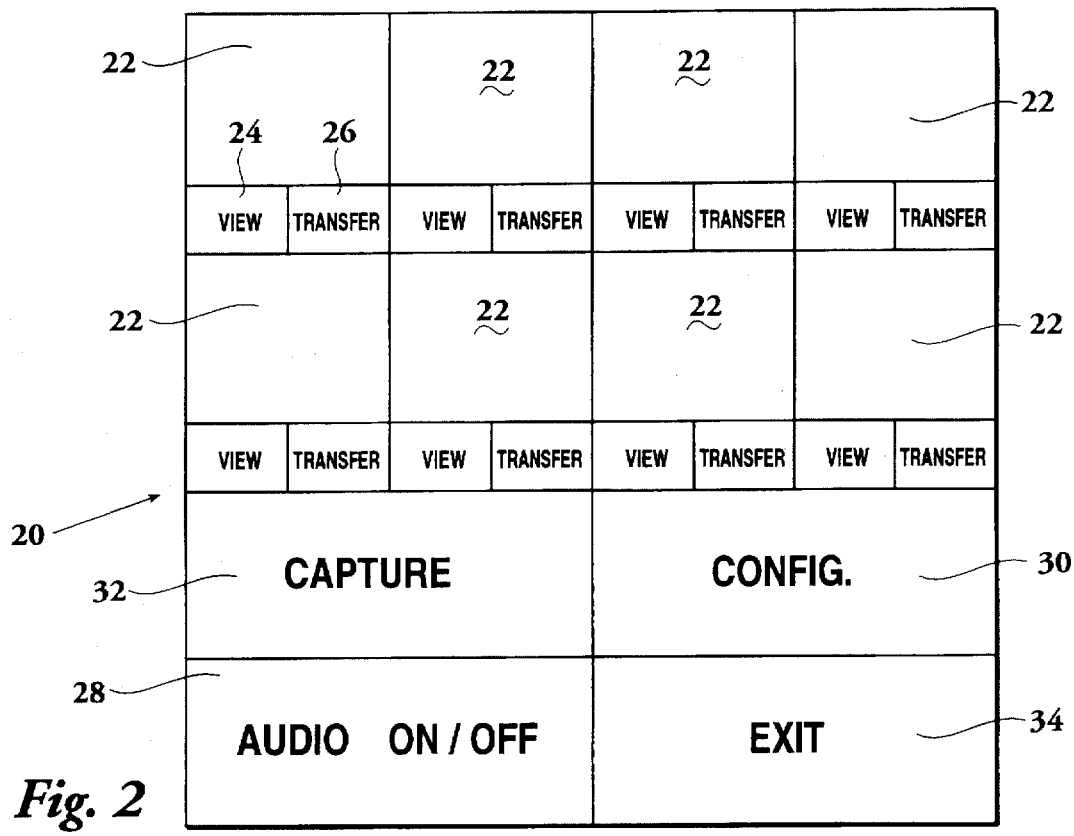
FIG. 2 is the control screen of the remote unit.
Figure 3:
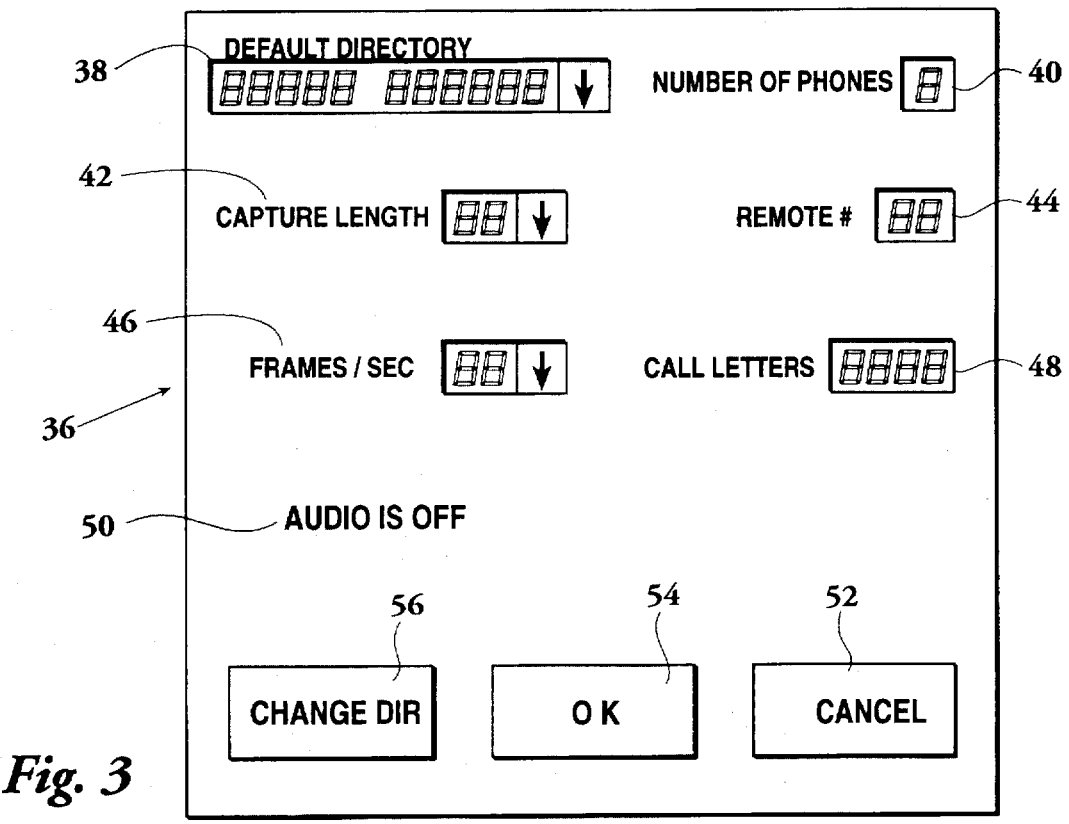
FIG. 3 is the configuration screen of the remote unit.

1. A video palette file is copied to "MICROSOFT® WINDOWS™" clipboard. This video palette file is a created data file stored on the hard disk of the remote. This video palette file is created with "VIDEO FOR WINDOWS" by loading a video clip and extracting the color palette from that clip.
2. The second step is that the control screen is painted on the monitor of the remote without pictures. FIG. 2 depicts this control screen 20 with boxes, collectively 22, shown without pictures therein.
3. Bit map files are obtained and displayed into boxes 22 of screen 20. A different bit map file will be displayed in each box 22 on screen 20. Bit map files are created by "VIDEO FOR WINDOWS" by retrieving the first frame of video from the captured video file, supplying the color from the stored palette file, and displaying this image in one of the boxes 22. These video files are displayed (or catalogued) on control screen 20 to allow quick identification and selection of a file for retrieval or transmission. The remote unit is capable of storing and displaying up to eight (8) bit map files. When the ninth file is captured, the software will automatically overwrite the oldest captured data file and display this new file on control screen 20.
4. The software sequence then reads the configuration files created as a result of user selection of capture and storage parameters. These parameters are input form a set of selection buttons found on control screen 20 of FIG. 2.
5. The user selects whether the video signal will be captured either with or without audio. "SELECTION" button 28 on control screen 20 of FIG. 2 requests the choice of capture and storage of audio. The selection buttons on screen 20 are activated using any conventional means such as the computer keyboard, mouse, or similar pointing device. An audio capture card installed in the remote unit captures the audio of an input signal. Capture with audio makes the data file longer since the audio signal must also be digitized, compressed, and stored in the remote unit's hard disk. It is evident that the longer the data file, the longer the time required for transmission of the entire data file from the remote unit to the host unit. It is often desirable to transmit video files only without audio in situations where a broadcast station wants to provide video footage of a situation quickly. It is desirable for broadcast stations to provide such video coverage as quickly as possible after a newsworthy event has taken place, such as an accident or natural disaster. In these situations, it is desirable to broadcast the video footage of the incident in a remote location. Audio coverage can be made by a reporter on location in another fashion, such as over a cellular telephone.
6. The software sequence reads the configuration files created as a result of user selection of capture and storage parameters. These parameters are input from a "SELECTION" button 30 marked "CONFIGURE" found on screen 20 of FIG. 2. Selection of the "CONFIGURE" selection button 30 calls up a configuration file from the remote hard disk. The configuration file opens a "Window" bringing up a screen showing the capture configuration options. FIG. 3 depicts the configuration screen 36 which appears as a result of selecting the configuration "SELECTION" button 30 of FIG. 2. It is not necessary to input a set of configuration parameters each time a video signal is captured since the system stores the previous set of configuration parameters which were selected for the previous capture sequence.

The configuration parameters are discussed below.

7. Once the configuration parameters are selected, the video card in the remote unit captures the input video signal to its memory. Capture includes digitizing the input video signal to form a binary data file and then compressing that file. The file is compressed in order to conserve memory space and reduce transmission time. The remote unit then stores the digitized and compressed video signal as a data file with a cap extension on the hard disk. The capture sequence is initiated by activation of the "CAPTURE" selection button 32.
8. "EXIT" selection button 34 allows the user to exit the capture software sequence to a DOS prompt. The capture software sequence may be exited prior to powering off the remote unit after a video sequence is captured, transmitted, viewed, or edited.
9. After the video sequence is captured, it may be viewed, edited, or transferred to the host unit. Each bit map file box 22 has a "VIEW" selection button 24 and a "TRANSFER" selection button 26. Upon selection of "VIEW" button 24, a captured video data file may be retrieved from the remote hard disk and the video sequence run. The video sequence is displayed in its respective bit map file box 22.

"VIDEO FOR WINDOWS" provides the system the capability for editing a captured data file on the remote unit before it is transmitted to a host unit. As the file is being viewed, sequences may be deleted or edited together as desired.

Selection of "TRANSFER" button 26 initiates the transfer software sequence B and file splitting software sequence C, discussed below. The captured, digitized and compressed data file is then automatically transmitted to the host unit.

FIG. 3 depicts the configuration screen. Selection of the "CONFIGURE" button 30 of the capture screen 20, FIG. 2, calls up a stored configuration file. This configuration file displays the configuration screen 36 of FIG. 3.

Referring to FIG. 3, the default directory request 38 allows for a choice of host name. Default directory listing 38 is a listing of all the host locations to which a data file may be transmitted. Choosing a host name in default directory 38 accesses the transmission parameters for that host name entered and stored in a transfer file, discussed below.

Phone parameter 40 allows for selection of the number of cellular telephones to be used to transmit the captured data file from the remote unit to the host unit. The greater the number of cellular telephones used to transmit, the lesser the transmission time. It is often desirable to transmit a video file as quickly as possible, especially in broadcast news situations where the goal is to broadcast video clips of developing news features as soon as possible. Although there is no theoretical limit to the number of cellular telephones which may be installed in the remote unit upon combination of additional processors, it has been found that between two and four are sufficient for most applications.

Capture length parameter 42 allows for selection of the length of the video sequence to be captured. Generally, video sequences will be between five (5) and one hundred twenty (120) seconds in length.

The video card is capable of capturing an input video signal at a selected number of frames per second. Frames per second parameter 46 allows for this selection on configuration screen 36. The number of frames per second in which the video card will capture a video sequence generally ranges between one (1) and thirty (30) frames/second. As the number of frames per second in which the file is captured increases, the resultant captured file will approach full motion when it is viewed upon playback. It follows that the greater number of frames captured per second, the larger the data file will be upon capture, which will require a longer transmission time. It is the option of the user to select the desired number of frames per second, understanding that video quality may be sacrificed for transmission speed. In situations where the video subject is stationary, or moving slowly, this sacrifice in video quality may not be present.

In situations where multiple remote units transmit back to a single host unit, it is desirable to identify the remote unit from which transmission is commenced. This naming convention is advantageous to ensure the stored file on the host unit will not be overwritten by an identically named video file of different content. Remote # parameter 44 allows for selection of a remote unit number between 00 and 99. Upon capture, a data file is created and named with an identification of the remote unit number.

The call letter selection parameter 48 allows for input of the call letters of the host broadcast station to which the captured file will be transmitted. Any four (4) characters may be entered as the station call letters. When the capture file is created, it will be named with the input call letters in addition to the remote number as discussed above. The captured file will have a file extension cap. Input of the call letters is desirable when a remote unit transmits to several host units located at different broadcast stations having different call letters.

Audio capture parameter 50 identified whether capture of audio has been selected on capture software sequence A, FIG. 2. Audio capture parameter 50 will either display "AUDIO IS ON" or "AUDIO IS OFF," depending upon the previous selection.

Selection buttons 52, 54, and 56 of capture configuration screen 36 are selection buttons commonly found using the "MICROSOFT® WINDOWS™" environment. "CANCEL" selection button 52 instructs the remote unit to disregard any changes made on the configuration screen 36 and abort back to the control screen 20, FIG. 2. When "CANCEL" button 52 is selected, the remote unit will default back to the previously stored parameters.

If changes are made to the capture configuration screen 36, those changes can be stored as a configuration file on the disk drive. Selection button 54, marked "OK" instructs the remote unit to write over the previously saved configuration file. This new set of parameters will then become the default parameters until further changes are made using configuration screen 36.

The "CHANGE DIR" selection button 56 allows changes to be made to the dialing directories in the transfer software sequence B discussed below. Selection of the "CHANGE DIR" button 56 calls up the stored dialing directory file which allows changes to be made to the dialing directory used with the transfer software sequence C.

Upon selection, a program file is retrieved from the transfer software sequence B stored on the hard disk drive. This program file paints a dialog directory screen on the monitor of the remote unit to allow changes to be made to the dialing directory. If no changes are necessary, the transfer software sequence will use the previously stored information. The dialing directory screen is similar to dialing directory screens used with communications software packages commercially available with the exception that this dialing directory includes dialing information for each transmission line in the remote unit. In the preferred embodiment, there are four modems and four cellular telephones installed. Hence, there will be dialing directory information for each cellular telephone.

The dialing directory information stored in transfer software sequence B, and displayed in the dialing directory screen, lists the first and last name and telephone number of the receiving host unit. When the correct dialing directory information is input, it may be saved into the transfer file and the dialing directory screen exited.

Once the dialing directory information is stored and the dialing directory screen exited, capture screen 20 of FIG. 2 is again displayed on the monitor. The remote unit is now ready to transmit the newly captured video sequence to the host unit. Transmission of a data file is accomplished by selecting the "TRANSFER" button 26 in the bit map file box 22 containing the first frame of video of the file to be transmitted. Selection of "TRANSFER" button 26 initiates the transfer software sequence B and the file splitting software sequence C.

Transfer software sequence B enables the remote unit to communicate with the host unit to transmit a stored data file using the system hardware. Transfer software sequence B contains all of the instructions necessary to initialize the communications ports on the remote, obtain a cellular connection with each cellular telephone to the host unit, obtain the stored data file, initiate file splitting sequence C, and transmit the split data file. The remote unit uses the run time module of a communications software package, such as Procom Plus® for WINDOWS™ which is loaded onto the remote. Communications software packages such as Procom Plus® for WINDOWS™ are available commercially.

Upon selection of the transfer button 26 of FIG. 2, the configuration file is read containing the configuration parameters selected above. This includes the dialing directory information. Transfer software sequence B is then called for each communications port to which the data file will be transmitted. Each modem interfaces through a different communications port. In the preferred embodiment, transfer software sequence B will be called four times.

TRANSFER SOFTWARE SEQUENCE B

1. The first program called for a communications port (COM1) controls the transfer process. COM1 also controls the monitor display notifying the operator of the throughput, size of the file, and the percentage complete.

2. Each of the other communications ports communicates with COM1 in the Windows™ environment, using dynamic data exchange (DDE). DDE is known in the industry and allows multiple applications to share information.

3. COM1 calls file splitting software sequence C, discussed below, and initiates the splitting of the data file. The data file is split into 10K pieces, or files. Each 10K file is created with a DOS archive bit set affixed to the file. As each 10K file of the data file is created, it is stored having a sequential file name extension from 001-999.

4. The modems interfacing each communication port execute the dialing directory file discussed above and obtain a connection with the telephone line on the host unit. The program automatically sends the cellular strings from each communications port to initialize the modems on the host unit. All other settings such as baud rate, protocol, and miscellaneous AT commands, are preset in the remote and host unit. The transmission system operates using a Z modem-based protocol.

5. Each communications port executes a dialing directory (DIR) command to locate a file containing an archived bit set. Once a file is located, it is retrieved, the archived bit set removed, and the 10K file transmitted from that line. It is not necessary for the stored files to be transmitted in sequential order since the host unit will recombine the file using the numbering system discussed above. If an error occurs during transmission, the program puts the archived bit set back on the file so that the 10K file can be transmitted from another line. Once transmission of a 10K file is complete, the file is saved on the hard disc, and another having an archived bit set is received and transmitted.

6. The 10K file files containing archived bit sets are retrieved, transmitted, and stored until all have been sent. When a communications port finds no more files having archived bit sets, it hangs up automatically.

7. If a cellular line loses communications with the host unit or if interference prohibits accurate transmission of a file, the line will drop out, and the remaining files will be transmitted from the remaining ports.

8. All of the transmitted, restored, 10K files are recombined into a complete data file.

Files may be transmitted using telephone lines, cellular, radio and other telemetric frequencies. In the preferred embodiment, cellular telephones are integrated with the remote unit to allow transmission of files from areas which are inaccessible to standard telephone lines. It may be desirable, in certain specialized applications, to transmit from a single remote location or locations where standard telephone lines are accessible. The remote unit may still be portable as long as a telephone jack is available for transmission. In that event, the cellular telephones are omitted from the remote, and the modems connected to standard telephone jacks, using standard telephone connectors and wiring.

In areas which are inaccessible to standard telephone lines and outside cellular telephone "cell," files can be transmitted using radio frequencies. In order to accomplish this, the cellular telephones in the remote are replaced with radio transmitters. Corresponding radio receivers are then installed in the host unit to receive the signal transmitted from the remote. Each transmitter operates using a different frequency so as to keep each signal segregated.

Transmission of the data file is accomplished automatically by the remote unit once transfer button 26 of FIG. 2 is selected. This allows the operator freedom to pursue other video clips for subsequent transfer and submission during the transmission process. In this manner, the invention provides rapid access and broadcasts the video segments from locations generally inaccessible and cost prohibitive much faster than conventional methods.

In situations where news teams are sent out in a vehicle to obtain video segments, an inverter could be installed in the vehicle to convert DC from its battery to AC to be used by the remote unit. In addition, five DB gain antennas could be mounted on the vehicle to improve transmission quality of the cellular signal. An antenna would be mounted on the vehicle for each cellular telephone in the remote unit. A video signal could then be captured at one remote location, transfer button 26 selected, and the remote unit transported in the vehicle to a different location while it is transmitting the file.

In order to decrease transmission time of the data file, it may be split into 10K files and transmitted over multiple land telephone lines, cellular telephones, or radio frequencies.

FILE SPLITTING SOFTWARE C

1. After transfer button 26 of FIG. 2 is selected, COM1 opens the main data file and begins splitting that file into 10K files.

2. A DOS archive bit set is fixed to each 10K file. This archive bit set allows the transfer software sequence B to determine whether a file on the directory is a file to be transmitted. It also enables it to determine whether a file has already been transmitted. As each file is retrieved, the DOS archive bit set is removed prior to transmission. Transmission is complete when there are no files left on the directory containing a DOS archive bit set. Each cellular line on the remote will hang up automatically.

3. After all of the 10K file files have been transmitted and each phone line has hung up, COM1 begins piecing the 10K files back together. This is accomplished by sequential read-write operation. A master data file is opened, and then the files are counted between 001-999 (or until all files are used) and pieced together in their sequential order. Twenty K (20K) pieces are read, the file is created, and then written until the entire data file has been combined.

The host unit 3 of FIG. 1 is automated to receive a data file transmitted from remote unit 2. Host unit 3 is a personal computer having a 486DX-2/66 motherboard, 210 Mb hard disk drive, monitor, high speed serial ports, 1 MB Windows accelerator video card, MS DOS Ver. 6.2 operating system, trackball bus mouse, Microsoft® Windows™ Ver. 3.1, Novell® Netware Lite™, 16 Bit Ethernet card, and a 1.44 MB floppy drive. Host unit 3 also has up to four (4) modems connected to up to four (4) separate telephone lines to receive a signal transmitted from each cellular telephone of the remote. It is not necessary to install cellular telephones in host unit 3 unless it will be transported from location to location. In the general application, however, host unit 3 will be installed at a single location and wired to one to four telephone lines.

The number of modems in host unit 3 corresponds to the number of modems used in the remote unit 2. If radio transmitters are used in remote unit 2 instead of telephones, radio receivers would be installed in host unit 3 so that there is a corresponding radio receiver for each radio transmitter. Each radio receiver in host unit 3 is set to the same frequency as the radio transmitter in remote unit 2 from which it will receive transmitted data files.

The four modems in host unit 3 receive the data file transmitted by the four cellular telephones in remote unit 2 in 10K files. Host unit 3 recombines the split data file and copies it to a network hard disk drive for access by playback unit 4. The hard disk drive on host unit 3 stores only software necessary to run the functions of host unit 3. Data files received from remote unit 2 are stored on hard disk drive of playback unit 4. Host unit 3 and playback unit 4 are networked together. A pier-to-pier network, such as "Novell Lite™" by Novell® is particularly suitable for this purpose.

When host unit 3 is turned on, it automatically runs host boot software sequence D.

HOST BOOT SOFTWARE SEQUENCE D

1. Host unit 3 looks for the server device on the network. Playback unit 4 is addressed as the network server.
2. Host unit 3 logs onto the network as host.
3. Drive letter E: is mapped as "play here." Drive E: is a RAM drive in which data files are stored for immediate playback and viewed on an NTSC monitor or output to the master control.
4. Drive letter F: is mapped as "save here." This is the subdirectory on the hard disk drive of playback unit 4 to which host unit 3 stores data files received from remote unit 2.
5. Host unit 3 loads Windows™ or another suitable operating environment.
6. File reception software sequence E is initiated. File reception software sequence E allows host unit 3 to wait for and receive incoming data files automatically. One host unit can support as many as thirty (30) remote units. The host unit can only receive a transmitted data file from one remote unit at any given time, however.

File reception software sequence E is essentially the same as transfer software sequence B. File reception software sequence E automates each telephone line end modem of host unit 3 to obtain communication with each cellular telephone of remote unit 2 and receive the transmitted data file in 10K files and recombine the data file for storage on the hard disk drive of playback unit

FILE RECEPTION SOFTWARE SEQUENCE E

1. The first program called by host boot software sequence D for a communications port "COM1" controls the file reception process on host unit 3. "COM1" also controls the monitor display notifying the operator of the throughput, size of the file, and percentage complete.
2. Each of the other communications ports communicates with "COM1" in the WINDOWS™ environment, using dynamic data exchange (DDE). DDE is known in the industry and allows multiple applications to share information.
3. The modem's interfacing with each communications port are all ready to receive the cellular string transmitted by each cellular telephone in remote unit 2. Upon receipt of the cellular strings, the modem is ready to receive transmitted data. All other settings such as baud rate, protocol, and miscellaneous AT commands are preset in the host unit in order to automate the file receiving process.
4. As each COM port on remote unit 2 completes transfer of the data file in 10K files, the line will immediately drop out until all four lines have hung up.
5. Host unit 3 then recombines the 10K files into a complete data file using a sequential read/write operation. A master data file is opened in the E: subdirectory on the hard disk drive of the playback unit. The 10K files are then assembled according to their file extension created by remote unit 2 when the data file was split. The 10K files are assembled sequentially between 001 and 999. Twenty kilobyte (20K) pieces are read and then written until the entire data file has been recombined and stored on the network hard drive of playback unit 4.
6. Host unit 3 then executes line 1 of this file reception software sequence E and COM1 awaits connection with remote unit 2 to receive another transmitted data file.

Playback unit 4 of FIG. 1 is the interface between captured video and the station master control which outputs the signal. In the preferred embodiment, playback unit 4 is a personal computer with a 486DX-2/66 motherboard, 210 Mb hard disk drive, 1.44 MB floppy drive, high speed serial ports, 1 MB Windows accelerator video card, MS DOS Ver. 6.2 operating system, Microsoft® Windows™, Microsoft® Video for Windows, Novell® Netware Lite™, trackball bus mouse, video decompression card, audio decompression card, VGA video to NTSC scan converter, and 16 bit ethernet card. Playback unit 4 is automated so that upon boot, it logs into the network, accesses its multi-tasking environment such as Windows™, and is ready to retrieve and play stored data files.

PLAYBACK BOOT SOFTWARE SEQUENCE F

1. Playback unit 4 initializes network, with playback unit 4 being the server.
2. Playback unit 4 logs into the network as player.
3. Drive letter E: is mapped as "Play Here." Drive E: is a RAM drive in which data files are stored for immediate playback, viewed on an NTSC monitor, or output to the station's master control.
4. Driver letter F: is mapped as "Save Here." This is the subdirectory on the hard disk drive of playback unit 4 wherein which host unit 3 stores data files received from remote unit 2.
5. Playback unit 4 executes WINDOWS ™ or similar suitable multi-tasking environment such as OS/2 from IBM, UNIX, or Novell®.
6. WINDOWS™ automated to bring up the file manager.

Once the recombined data file has been stored on a network hard disk drive of playback unit 4, the data file may either remain stored for later use, edited, or retrieved for output to the master control. It may be advantageous to have numerous host units networked with a single playback unit so that numerous data files can be received from numerous remote units simultaneously. Alternatively, in a basic embodiment, host unit 3 and playback unit 4 could be integrated into a single host/playback unit.

Playback unit 4 has a video card installed in an expansion slot. This video card is similar as the video card installed in remote unit 2 with the exception that the capture module is not necessary. When a data file is retrieved by playback unit 4 for output to the master control, the video card decompresses the file and converts the digitized data to VGA.

If a data file received by host unit 3 is for immediate playback, it is "stored" in the E: drive. The E: drive is a drive for temporary storage of the data file for immediate playback or output to the master control.

If the data file received by host unit 3 is for later playback or output, it is saved in the F: drive for later retrieval. The F: drive is a subdirectory of the hard disk drive of playback unit 4 for storage of data files.

Once decompressed and converted to VGA, a scan converter card installed in playback unit 4 converts the VGA signal to the desired broadcast signal. Although "NTSC" is the most common broadcast signal, the signal could also be converted to "PAL," "Y/C video," or other broadcast signal as required. This "NTSC" signal output from the scan converter card can be viewed on an "NTSC" monitor for immediate playback for broadcast, or stored on video tape or other conventional means for later use.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method for transmitting a data file from a remote location to a host location, comprising:

splitting the data file into at least two components at the remote location in real time;

sequentially tagging each of said components;

transmitting said components over at least one telephone line, cellular, radio and other telemetric frequency;

receiving said transmitted components at the host location;

sequentially recombining said data file.

2. The method of claim 1 wherein said data file is split into components of equal size.

3. The method of claim 1 wherein said data file is split into 10K components.

4. The method of claim 1 wherein sequentially tagging said components further comprises the step of storing said components sequentially by alpha numeric.

5. The method of claim 4 wherein said pieces are sequentially recombined at the host location according to their sequential ordering.

6. The method of claim 1 wherein a bit flag is set to coordinate program flow.

7. A method of transmitting a data file from a remote unit with a plurality of communications ports to a host unit with a plurality of communications ports, comprising:

splitting the data file into a plurality of components, the number of said components being greater than the number of communications ports in said remote unit;

sequentially tagging each of said components;

executing the transmission of said components through the available communication ports of the remote unit to the available communication ports of the host unit via a transmission medium electronically linking each available communications port in said remote unit to a corresponding available communications port of said host unit;

recombining said data file.

8. The method of claim 7 wherein said data file is split into components of equal size.

9. The method of claim 7 wherein sequentially tagging said components further comprises the step of storing said components sequentially by alpha numerics.

10. The method of claim 9 wherein said pieces are sequentially recombined at the host location according to their sequential ordering.

11. The method of claim 7, further comprising:

storing said components of said data file prior to transmission;

setting a marker for each of said components as the data is stored;

selecting said pieces based on their marker settings and transmitting said components;

removing said marker prior to transmission.

12. The method of claim 11, including means for resetting said bit flag in the event said host unit fails to receive said transmitted component.

13. The method of claim 12 including inactivating any of said communication ports of said host unit in the event it loses connection with said host unit.

14. The method of claim 13 including transmitting the remaining components of said data file using the remaining communications ports of said remote unit in the event one is inactivated.

15. A method of claim 11 wherein the marker set on each component is a bit flag.

16. A method of transmission of a composite signal from a first location to a second location, comprising the steps of:

capturing said composite signal at the first location;

compressing said composite signal in real time;

transmitting said compressed composite signal oven a cellular frequency from said first location;

receiving said compressed composite signal at said second location.

17. The method according to claim 16 including the additional step of storing said composite signal at said first location prior to transmission.

18. The method according to claim 16 including the additional step of splitting the compressed composite signal into at least two components prior to transmission.

19. The method according to claim 18 further including the step of sequentially tagging each of said components prior to transmission.

20. The method according to claim 19 further including the step of storing said sequentially tagged components at said first location.

21. The method of claim 20 wherein said components are tagged by alpha numeric designations.

22. The method according to claim 19 wherein sequentially tagging each of said components includes placing a marker on each of said components.

23. The method according to claim 22 wherein said marker is a bit flag placed on each said component.

24. The method according to claim 18 wherein said compressed composite signal is split into components of approximately equal size.

25. The method of claim 18 wherein said compressed composite signal is split into 10K components.

26. The method of claim 25 wherein one of said components is smaller than 10K.

27. The method of claim 18 wherein said compressed composite signal is recombined at said second location.

28. The method of claim 19 wherein said tagged components are recombined in sequential order at said second location.

29. The method of claim 1 wherein said data file is compressed before it is split.

30. The method of claim 7 wherein said data file is compressed before it is split.

31. The method of claim 1 further including downloading said data file from the host unit to at least one playback unit.

32. The method of claim 7 further including downloading said data file from the host unit to at least one playback unit.

33. The method of claim 16 further including downloading said data file from the second location to a third location.

34. The method of claim 7 wherein said transmission medium is a telephone line, cellular, or other telemetric frequency.

* * * * *